United States Patent
Wang et al.

(10) Patent No.: US 11,845,186 B2
(45) Date of Patent: Dec. 19, 2023

(54) INVERSE KINEMATICS SOLVING METHOD FOR REDUNDANT ROBOT AND REDUNDANT ROBOT AND COMPUTER READABLE STORAGE MEDIUM USING THE SAME

(71) Applicant: UBTECH ROBOTICS CORP LTD, Shenzhen (CN)

(72) Inventors: Yuesong Wang, Shenzhen (CN); Liqun Huang, Shenzhen (CN); Xiaoyu Ren, Shenzhen (CN); Mingguo Zhao, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 345 days.

(21) Appl. No.: 17/138,942

(22) Filed: Dec. 31, 2020

(65) Prior Publication Data

US 2022/0009096 A1  Jan. 13, 2022

(30) Foreign Application Priority Data

Jul. 10, 2020  (CN) .......................... 202010659812.2

(51) Int. Cl.
  *B25J 9/16*  (2006.01)
(52) U.S. Cl.
  CPC .......... *B25J 9/1643* (2013.01); *B25J 9/1607* (2013.01); *G05B 2219/50391* (2013.01)
(58) Field of Classification Search
  CPC ...... B25J 9/1607; B25J 9/1643; B25J 9/1638; B25J 9/1664; B25J 9/1633; B25J 13/089;
  (Continued)

(56) References Cited

U.S. PATENT DOCUMENTS

2005/0038563 A1*  2/2005  Rauf ...................... B25J 9/1623
                                                                    700/245
2005/0143860 A1*  6/2005  Nakajima .............. B25J 9/1643
                                                                    700/245
(Continued)

FOREIGN PATENT DOCUMENTS

JP  2016155203 A  *  9/2016  .............. B25J 13/00

OTHER PUBLICATIONS

Fratu et al. "Using the Redundant Inverse Kinematics System for Collision Avoidance", Nov. 11, 2010, 2010 3rd International Symposium on Electrical and Electronics Engineering (ISEEE), pp. 88-93, https://ieeexplore.ieee.org/document/5628536?source=IQplus (Year: 2010).*

*Primary Examiner* — Khoi H Tran
*Assistant Examiner* — Tanner L Cullen

(57) ABSTRACT

An inverse kinematics solving method for redundant robot as well as a redundant robot using the same are provided. The method includes: obtaining an expression of a Jacobian matrix null space of a current configuration of each robotic arm of the redundant robot corresponding to a preset end pose of the robotic arm according to the preset end pose, and obtaining a relation between an angular velocity of the joints of the redundant robot in the Jacobian matrix null space of the current configuration based on the obtained expression; traversing the Jacobian matrix null space using the relation, and building an energy cost function of the redundant robot based on the relation; obtaining a target joint angle of each joint of the redundant robot based on the optimal inverse kinematics solution to transmit to the servo of the joint so as to control the joint.

15 Claims, 6 Drawing Sheets

---

Obtain an expression of a Jacobian matrix null space of a current configuration of each robotic arm of the redundant robot corresponding to a preset end pose of the robotic arm according to the preset end pose — S10

Traverse the Jacobian matrix null space using the relation, and building an energy cost function of the redundant robot based on the relation — S20

Obtain a target joint angle of each joint of the redundant robot based on the optimal inverse kinematics solution to transmit to the servo of the joint so as to control the joint — S30

(58) Field of Classification Search
CPC .......... B25J 9/023; G05B 2219/40367; G05B 2219/40495; G05B 2219/39062; G05B 2219/39066; G05B 2219/39361; G06F 17/16; G06F 17/11
See application file for complete search history.

(56) References Cited

U.S. PATENT DOCUMENTS

2020/0298403 A1\* 9/2020 Nilsson .................. B25J 9/1692
2021/0011458 A1\* 1/2021 Zhang .................... G06N 3/063

\* cited by examiner

INVERSE KINEMATICS SOLVING METHOD FOR REDUNDANT ROBOT AND REDUNDANT ROBOT AND COMPUTER READABLE STORAGE MEDIUM USING THE SAME

CROSS REFERENCE TO RELATED APPLICATIONS

The present disclosure claims priority to Chinese Patent Application No. 202010659812.2, filed Jul. 10, 2020, which is hereby incorporated by reference herein as if set forth in its entirety.

BACKGROUND

1. Technical Field

The present disclosure relates to redundant robot technology, and particularly to an inverse kinematics solving method for redundant robot as well as a redundant robot and a computer readable storage medium using the same.

2. Description of Related Art

The inverse kinematics of redundant robot refers to the process of providing planned end poses of a robot and using an inverse kinematics algorithm to solve a set of joint angles to transmit to the servo of each joint for motion control. Because inverse kinematics of redundant robot has infinite solutions, how to efficiently solving has become a widespread concern.

At present, the methods for solving inverse kinematics can generally be divided into two categories, namely analytical methods and numerical iteration methods. For analytical inverse kinematics, the geometric features of a robot are used to solve each joint angle. In this case, it is usually necessary to add some additional geometric constraints such as specifying the angle of the arm angle or the elbow joint in a certain plane, so as to perform solving. Its advantage is that the amount of calculations is small and has accurate solutions, while its disadvantage is that the obtained solution is not optimal in the infinite inverse solution. In addition, the robot cannot be solved directly at singular points, and the joint angle of the robot may jump, flip, or the like in the case that the trajectory of the end effector of the robotic arm passes through certain quadrants.

For numerical iterative inverse kinematics, the most typical one is the velocity level solving based on the Jacobian pseudoinverse matrix. In which, the joint angular velocity is calculated and then the joint angle is obtained through integration. Using the pseudoinverse matrix of the Jacobian matrix is substantially to add a constraint in the solution process, even if the sum of the change of the joint angles is the smallest during the iteration process. The essence of the numerical iteration method based on Jacobian pseudoinverse is to project the error of the end effector in the working space to each joint to perform a simple proportional control based on the error. The above-mentioned error is an error of the position and the posture, which can be represented by, for example, a vector (x, y, z, roll, pitch, yaw), where x, y and z is the coordinate of the position, and roll, pitch and yaw is the Euler angle of posture. By using this numerical iterative method, the error tends to converge to zero. However, the disadvantage of this calculation method is that the amount of calculation is large, the setting of the gain matrix needs to consider the computing power of the system, and the result of the iteration is uncontrollable. Sometimes the robot will jitter, and the joint angle of the robot easily exceeds the working range.

BRIEF DESCRIPTION OF THE DRAWINGS

To describe the technical schemes in the embodiments of the present disclosure more clearly, the following briefly introduces the drawings required for describing the embodiments. It should be understood that, the drawings in the following description merely show some embodiments of the present disclosure, hence should not be regarded as limitations to the scope of the present disclosure. In the figures, similar elements are numbered similarly.

DETAILED DESCRIPTION

Figure 1:
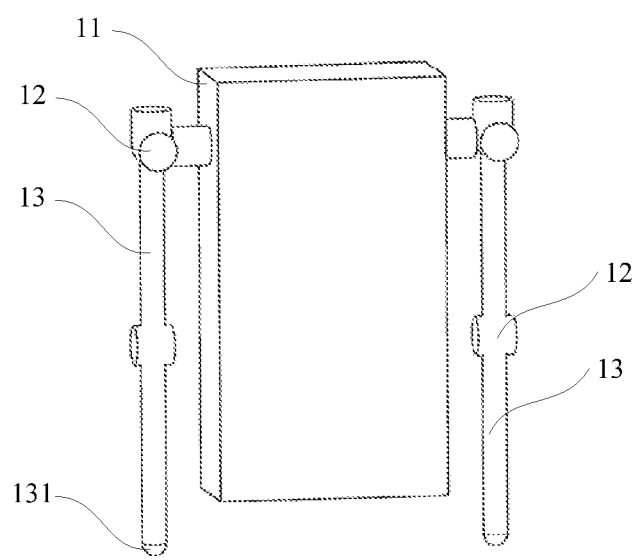
FIG. 1 is a schematic diagram of a redundant robot according to an embodiment of the present disclosure.

The technical solutions in the embodiments of the present disclosure will be clearly and completely described below with reference to the drawings. Apparently, the described embodiments are part of the embodiments of the present disclosure, not all of the embodiments.

The components in the embodiments of the present disclosure that are illustrated in the drawings can generally be arranged and designed in various manners. Therefore, the following detailed description of the embodiments of the present disclosure provided in the drawings is not intended to limit the scope of the present disclosure to be protected, but merely fore representing the embodiments of the present disclosure. Based on the embodiments, all other embodiments obtained by those skilled in the art without creative efforts shall be within the scope of the present disclosure.

In the following descriptions, the terms "including", "comprising", "having" and their cognates that are used in the embodiments of the present disclosure are only intended to represent specific features, numbers, steps, operations, elements, components, or combinations of the foregoing items, and should not be understood as excluding the possibilities of the existence of one or more other features, numbers, steps, operations, elements, components or combinations of the foregoing items or adding one or more features, numbers, steps, operations, elements, components or combinations of the foregoing items.

In addition, in the present disclosure, the terms "first", "second", "third", and the like are only used for distinguishing, and cannot be understood as indicating or implying relative importance.

Unless otherwise defined, all terms (including technical and scientific terms) used herein have the same meanings as commonly understood by those skilled in the art to which the embodiments of the present disclosure belong. The terms (e.g., the terms those defined in commonly used dictionaries) will be interpreted as having the same meaning as the contextual meaning in the relevant technology and will not be interpreted as having idealized or overly formal meanings, unless clearly defined in the embodiments of the present disclosure.

Figure 2:
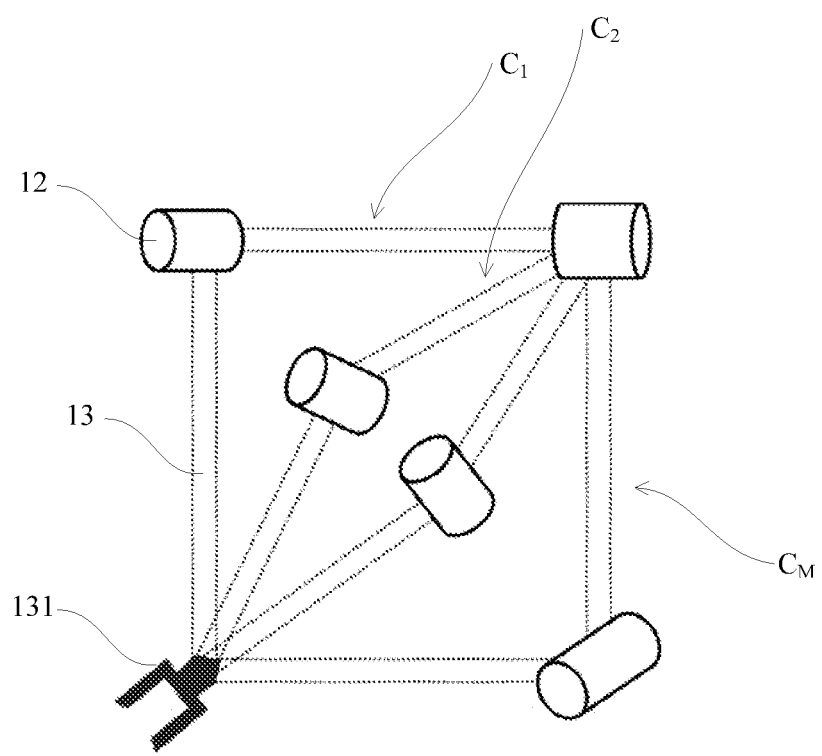
FIG. 2 is a schematic diagram of an example of the change of the configurations of the redundant robot of FIG. 1 in the same end pose according to an embodiment of the present disclosure.

When a planned end pose (a pose includes a position and a posture) of a robotic arm is known, inverse kinematics can be used to calculate a set of joint angles for pose control. For a robotic arm with redundancy, its null space is represented as that the robotic arm configurations of its infinite sets of joint angles all correspond to the same end pose. It can be further understood that, the robotic arm has a joint angular velocity while the velocity of the end effector of the robotic arm is always zero. FIG. 1 is a schematic diagram of a redundant robot according to an embodiment of the present disclosure. Referring to FIG. 1, the structure of a redundant robot is shown. The redundant robot 1 has a body 11, joints 12, and robotic arms 13. The joints 12 are full rotary joints of two-four degrees of freedom. Each of the joints 12 has a servo driven by a motor. Each of the robotic arms 13 is connected to one or more of the joints 12, and the movement of the robotic arm 13 is realized by the motor to rotate an output shaft of the servo which is connected to the robotic arm 13. FIG. 2 is a schematic diagram of an example of the change of the configurations of the redundant robot of FIG. 1 in the same end pose according to an embodiment of the present disclosure. Referring to FIG. 2, the null space of one of the robotic arms with four degree of freedom is shown. When the robot arm 13 has different configurations, the pose of each joint 12 is different from each other, while an end effector 131 of the robot arm 13 always has the same pose.

In order to obtain a better set of inverse kinematics solutions from infinite solutions, the method of the embodiments of the present disclosure utilizes the features that an organism such as a human body usually move in the least energy-consuming and most comfortable way. That is, from the perspective of energy, in the null space that meets the conditions, the configuration with the best energy is selected as the result of the inverse kinematics solution. The method is simple in concept, which not only conforms to the general motion law of organisms, but also makes each joint angle of the robotic arm continuous and smooth during the end effector 131 of the robotic arm moves along with the trajectory in the working space.

The method for solving the inverse kinematics of the redundant robot is described through embodiments as follows.

Embodiment 1

Figure 3:
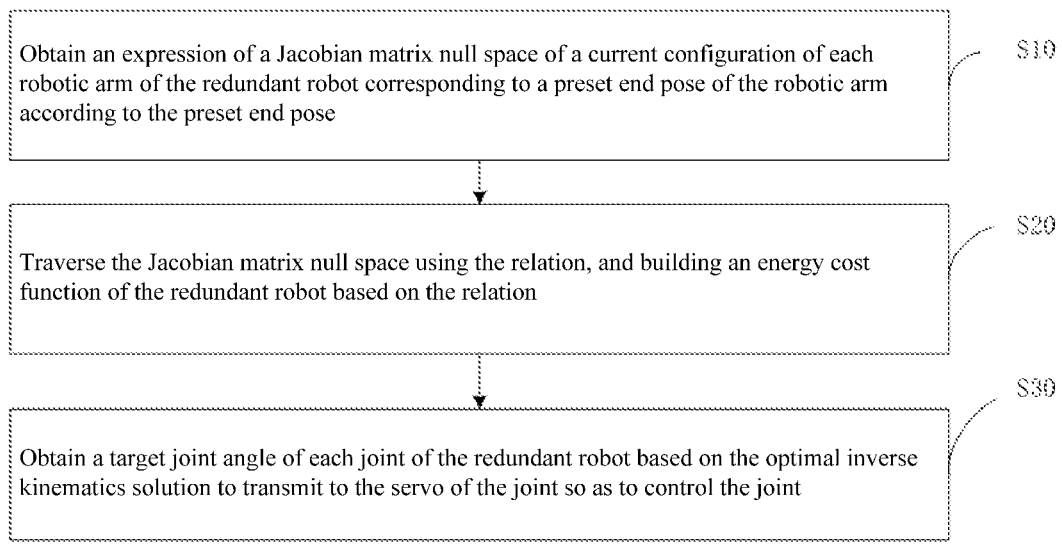
FIG. 3 is a flow chart of the first embodiment of an inverse kinematics solving method for redundant robot according to the present disclosure.
Figure 6:
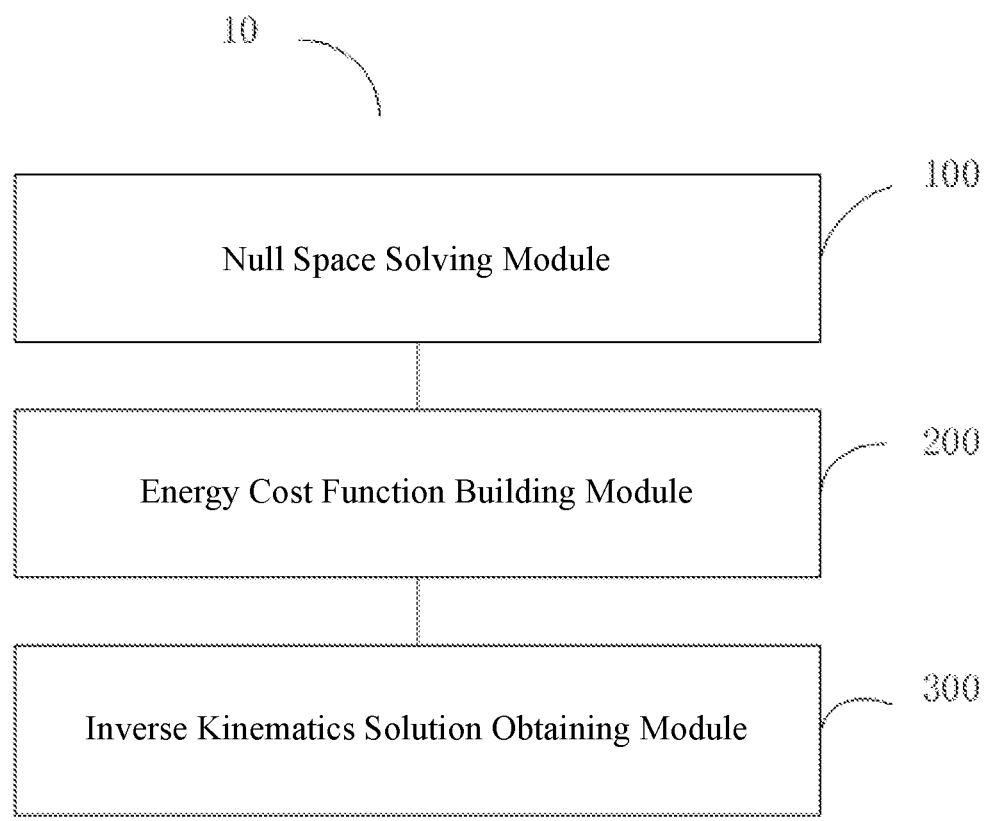
FIG. 6 is a schematic block diagram of an embodiment of an inverse kinematics solving apparatus according to the present disclosure.

FIG. 3 is a flow chart of the first embodiment of an inverse kinematics solving method for redundant robot according to the present disclosure. In this embodiment, an inverse kinematics solving method for a redundant robot is provided, which uses the null space of the redundant robot and uses energy as the judging criteria so as to improve the insufficiencies of the inverse kinematics solving method in the prior art. The method is a computer-implemented method executable for a processor, which may be implemented through and applied to a redundant robot as shown in FIG. 1 or an inverse kinematics solving apparatus as shown in FIG. 6. As shown in FIG. 3, the method mainly includes the following steps.

S10: obtaining an expression of a Jacobian matrix null space of a current configuration of each robotic arm of the redundant robot corresponding to a preset end pose of (an effector of) the robotic arm according to the preset end pose. In order to obtain a relation between an angular velocity of the joints of the redundant robot in the Jacobian matrix null space of the current configuration based on the obtained expression.

In 3D workspace, the preset end pose of the effector usually has six components: $t=[x,y,z,\alpha,\beta,\gamma]$, representing 3 translation and 3 rotation unit vectors. And its end velocity $\dot{t}$ can be mapped into the joint space by a Jacobian matrix J as an equation of:

$$\dot{t}=J\cdot\dot{q} \qquad (1)$$

For redundant robots, the Jacobian matrix J is a non-square matrix with more columns than rows. The general solution of equation ① can be represented a an equation of s:

$$\dot{q}=J^{\dagger}\dot{t}+(I-J^{\dagger}J)\cdot\dot{\theta}^{*} \qquad (2)$$

where, $J^{\dagger}$ represents pseudoinverse of the Jacobian matrix J, $(I-J^{\dagger}J)$ represents the null space mapping of an arbitrary velocity vector $\dot{\theta}^{*}$. Therefore, the second term on the right side of equation ② creating no end effector velocity, which can be used to obtain the numerical expression of redundant manipulator inverse kinematics solution in the next step described below.

In which, the configuration of the robotic arm is specifically the configuration of the end effector, which includes a union of infinite sets of joint angles. The union can be expressed by the null space of Jacobian matrix. The Jacobian matrix null space also represents the robot manipulator null space. It indicates infinite IK (inverse kinematics) solutions corresponding to one robot end effector pose.

After the preset end pose (i.e., the pose of the end effector set in advance) of each robotic arm, that is, the preset pose of an end effector (e.g., a fixture) of each robotic arm of the redundant robot is given, a set of joint angles (i.e., the angles of the joints of the redundant robot) are obtained through inverse kinematics and transmitted to the servo of the joints for controlling the joints, so that the redundant robot performs the corresponding motion. In this embodiment, after the preset end pose is given, a Jacobian matrix of the configuration is solved and calculated with the concept of the corresponding null space of the Jacobian matrix (i.e., the Jacobian matrix null space) and the energy cost function, so as to obtain the configuration of the joint angle with optimal energy to take as the required inverse kinematics solution. In which, the Jacobian matrix refers to the partial differential matrix of the configuration of the end effector of the robotic arm with respect to the coordinate system of the body of the robot.

For the above-mentioned step S10, as an example, if the degree of freedom of the redundant robot (i.e., the number of joints) is n and the current configuration is $\Theta_0$, the set of configurations of the redundant robot corresponding to the same end pose is:

$$\Theta=\Theta_0+f[(I_n-J^{\dagger}J)\cdot p];$$

where, $I_n$ is an n×n identity matrix; p is any n×1 vector; J is the Jacobian matrix of the redundant robot in the current configuration, and $J^{\dagger}$ is a pseudoinverse matrix of the Jacobian matrix. It can be understood that, the operator $(I_4-J^{\dagger}J)$ is used to project any vector p to the Jacobian matrix null space (i.e., the null space of the above-mentioned Jacobian matrix) so as to generate the joint angular velocity $\dot{\Theta}$ of each joint (through the formula of $\dot{\Theta}=(I_n-J^\dagger J)\cdot p$). By integrating the joint angular velocity, the required joint angle can be obtained.

The end velocity v and the joint angular velocity $\dot{\Theta}$ of a robotic arm of the redundant robot have the mapping relationship of $v=J\cdot\dot{\Theta}$. Therefore, according to the definition of the Jacobian matrix null space, the expression of the Jacobian matrix null space meets $\exists\dot{\Theta}$, $J\cdot\dot{\Theta}=0$, that is, for any joint angular velocity $\dot{\Theta}$, the end velocity is always zero.

The Jacobian matrix is a function of joint angle, and it also determines the dimension of its null space. Usually, in non-specific cases, the Jacobian matrix null space is one-dimensional, that is, the number of free variables is one. In other words, the joint angular velocity $\dot{\Theta}$ that makes the end velocity to be 0 is actually a function of joint angular velocity, that is, there is a relation between each joint angular velocity, so that other joint angular velocities can be described using the same joint angular velocity. Since the joint angular velocity and the joint angle meet the integral relationship, for the joint angles, any one of the joint angles can be selected to describe the other joint angles.

Taking the robotic arm with four degrees of freedom in FIG. 1 as an example, if the position of an end effector of a robotic arm is given for solving the four joint angles ($\theta_1$, $\theta_2$, $\theta_3$, $\theta_4$) of the robotic arm, according to the above-mentioned formula, the joint angular velocity $\dot{\Theta}$ meets $\dot{\Theta}=(I_n-J^\dagger J)\cdot p$, where the Jacobian matrix J is a 3×4 matrix, which is a function of the above-mentioned four joint angle variables.

Since the expression of the Jacobian matrix null space meets $\exists\dot{\Theta}$, $J\cdot\dot{\Theta}=0$, and the null space is a one-dimensional null space (because the Jacobian matrix J is a 3×4 matrix), the joint angular velocity $\dot{\Theta}$ in this case is a function of a variable of joint angular velocity. Therefore, any one joint angle such as $\theta_1$ can be selected from the above-mentioned four joint angles to represent other joint angles. According to the obtained expression of the zero-space of the Jacobian matrix, the relation between the angular velocity of each joint can be described through the same joint angle variable as $\theta_2=f_1(k,\theta_1)$, $\theta_3=f_2(k,\theta_1)$, and $\theta_4=f_3(k,\theta_1)$. In which, k is a real number, $f_1$, $f_2$ and $f_3$ respectively represent three functions of the joint angle $\theta_1$. It can be understood that, for each value of the above-mentioned variable k, a set of joint angles will be correspondingly obtained, and the robot has a corresponding configuration, while the position of the end effector always remains unchanged.

S20: traversing the Jacobian matrix null space using the relation, and building an energy cost function of the redundant robot based on the relation. The energy cost function includes a gravitational potential energy cost function, a gravity compensation function, or a repulsive potential energy cost function. The energy cost function can be used as a judging criterion to determine the optimal IK solution in the Jacobian matrix null space which obtained in step S10.

In robot manipulation, energy consumption is always concerned due to limited battery capacity. As mentioned earlier, there are infinite IK solutions for redundant robot. The demand for finding the IK solution with the minimum energy consumption is needed. Energy cost function of the redundant robot can be build based on forward kinematics algorithm. The less energy the robot consumes at each moment, the more efficient utilizing the battery, the longer the robot operates. The energy cost function could be created in several ways, one of the simplest is through the minimum gravity potential energy of the robot.

The energy (cost) function can be used as a criterion to find the optimal inverse kinematics solution. The union of infinite inverse kinematics solutions forms the internal motion of the redundant robot, mathematically it can be described as:

$$\theta = \theta_0 + \int \dot{\theta} dt$$

$$\dot{\theta} = (I_n - J^\dagger J)\dot{\theta}_k,$$

where $\theta_0$ is an inverse kinematics solution, $\dot{\theta}$ is a joint velocity generating no end effector motion, $I_n$ is an identity matrix of order n, J is a Jacobian matrix, $J^\dagger$ is a right pseudo-inverse of J, $\dot{\theta}_k$ is a vector of arbitrary joint velocities.

By using forward kinematics, each joint angle is used to calculate the position and orientation of each link of the redundant robot that is connected to the joint. In this embodiment, energy is used as the evaluation criterion, and the energy cost function of the redundant robot is built based on the forward kinematics algorithm according to each joint angle. The optimal solution is determined by an energy objective function reaching the minimum of the energy cost function. The energy objective function can be interpreted as the real physical energy of robot, like the total gravitational energy, or be a virtual energy based on lab necessity. As an example, the physical potential energy may include, but is not limited to, gravitational potential energy, gravitational compensation potential energy, and the like. The built virtual energy may include, but is not limited to, a virtual repulsive potential energy generated by adding a potential field at corresponding joint(s).

In one embodiment, after the energy cost function is built, since the energy cost function is a function of each joint angle, the relation between the angular velocity of each joint can be used to describe the variable of each joint angle in the energy cost function based on the same joint angle variable $\theta_i$, where i is any value from 1 to n. Therefore, the expression of the energy cost function only about the joint angle variable $\theta_i$ will be obtained.

It can be understood that, the target joint angles in this case is a set of joint angles with the optimal energy (i.e., the lowest potential energy). The optimal energy may be the minimum or maximum energy, which is determined according to the actual energy cost function and the movement goal. Taking the gravitational potential energy upon the redundant robot as an example, it is similar to the movement of living organisms (e.g., human bodies), and is always expected to move in the most comfortable way with the least energy loss. Similarly, for the redundant robot, the gravitational potential energy cost function in this case should be solved through inverse kinematics by taking the minimum gravitational potential energy as the goal.

S30: obtaining a target joint angle of each joint of the redundant robot based on the optimal inverse kinematics solution to transmit to the servo of the joint so as to control the joint.

The target joint angles is continuous and smooth as long as the created energy cost function in S20 is continuous and differentiable. The resulting movement not only meets the preset end effector position and orientation, but also minimizes the energy consumption. Therefore, instructions with the joint angles can be used as control input at that moment.

The calculated set of joint angles are used as the optimal inverse kinematics solution for making the redundant robot to maintain the same end pose, which is transmitted to the corresponding servo of the joint so as to perform positional control of joint, thereby realizing the required robot motion. It can be understood that, after the redundant robot performs the corresponding joint control according to the joint angles, its joint poses will be updated, that is, the current configuration will be switched to the next configuration.

Figure 4:
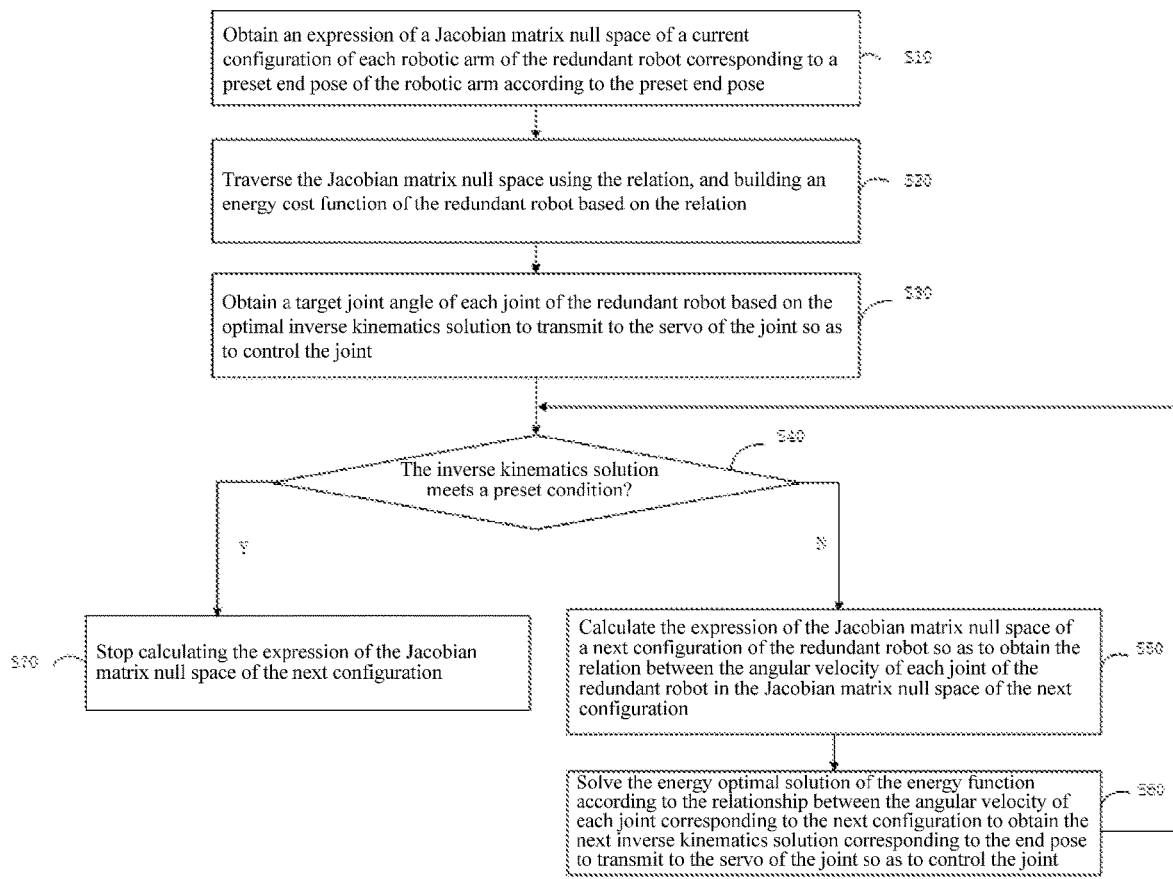
FIG. 4 is a flow chart of the second embodiment of an inverse kinematics solving method for redundant robot according to the present disclosure.

Since only one switch of the configuration may not be able to meet further requirements such as avoiding obstacles, it further needs to solve the next set or more sets of inverse kinematics solutions. FIG. 4 is a flow chart of the second embodiment of an inverse kinematics solving method for redundant robot according to the present disclosure. As shown in FIG. 4, the inverse kinematics solving method for redundant robot of FIG. 3 further includes the following steps.

S40: determining whether the inverse kinematics solution meets a preset condition.

In one embodiment, if the inverse kinematics solution obtained through the above-mentioned step S30 does not meet the preset condition, the next set of inverse kinematics solution needs to be solved, that is, steps S50-S60 are to be executed. Otherwise, if it is determined that the preset condition is met, step S70 is to be executed, that is, the next set of inverse kinematics solution for the next configuration will not be calculated. It can be understood that, the above-mentioned preset conditions can be set according to actual needs, for example, it can be set to avoid obstacles in a certain position under the premise of the same end effector or pass through a specific position.

S50: calculating the expression of the Jacobian matrix null space of a next configuration of the redundant robot so as to obtain the relation between the angular velocity of each joint of the redundant robot in the Jacobian matrix null space of the next configuration.

S60: solving the energy optimal solution of the energy cost function according to the relation between the angular velocity of each joint of the redundant robot corresponding to the next configuration to obtain the next inverse kinematics solution corresponding to the end pose to transmit to the servo of the joint so as to control the joint. Then, returning to the step of calculating the expression of the Jacobian matrix null space of the next configuration of each robotic arm of the redundant robot, that is, step S50.

S70: stopping calculating the expression of the Jacobian matrix null space of the next configuration.

Since the joint angles are different at different moments during movement, the Jacobian matrix is a linear transformation of the joint angles. When the joint angle of the next moment changes, the Jacobian matrix will also be different and then its corresponding null space will also change. Therefore, if the next inverse kinematics solution needs to be solved, after each joint control, the Jacobian matrix null space of the redundant robot in the new configuration needs to be solved again.

For steps S50-S60, as shown in FIG. 2, assuming that the redundant robot is currently in configuration 1 $C_1$, after obtaining a set of joint angles through the above-mentioned steps S10-S30 and performing joint control, the pose of each joint of the redundant robot will be updated to make the redundant to change to configuration 2 $C_2$. At this time, the Jacobian matrix will also change. Therefore, it is necessary to calculate the expression of the Jacobian matrix null space corresponding to configuration 2 $C_2$, so as to obtain the new relation between the angular velocity of each joint. After that, still taking the optimal energy as the goal, the next set of joint angles are solved with respect to the energy cost function. For the specific steps, please refer to the above-mentioned steps S10-S30, and the description will not be repeated herein. Subsequently, it is determined again whether the next inverse kinematics solution meets the preset condition, that is, it returns to step S40. If it meets, step S70 is executed; otherwise, the above-mentioned steps S50-S60 are repeated until the solved inverse kinematics solution can meet the preset condition. It can be understood that, if the position of the end effector changes during the period, the above-mentioned process of repeatedly calculating each joint angle should be stopped.

In this embodiment, in the infinite inverse kinematics solution, the inverse kinematics solving method for redundant robot uses the Jacobian matrix null space, and takes energy as the evaluation criterion. By selecting the configuration with the optimal energy as the inverse kinematics solution, the concept can be simple, intuitive, and can be calculated online, which provides a new way of solving redundant inverse kinematics. Moreover, the method conforms to the general motion law of the organism, so that the joints near the base of the robotic arm (the base is fixedly connected to the body of the robot) move less while the joints distant from the base move more, that is, to perform the motion control with the least energy consumption. In addition, when the end effector of the robotic arm moves in the working space along with a trajectory in real-time, each joint angle also has the characteristic of continuous and smooth, so the discontinuity such as jumps and flips in the existing solutions of the prior art can be well solved.

Embodiment 2

In this embodiment, an inverse kinematics solving method for redundant robot is provided based on the method of the above-mentioned embodiment 1 as shown in FIG. 3. In the above-mentioned step S20 which builds the energy cost function of the redundant robot based on the forward kinematics algorithm, the energy cost function may include, but is not limited to, a gravitational potential energy cost function, a gravity compensation function, a repulsive potential energy cost function, and/or the like. The energy cost function can be built according to actual needs.

Figure 5:
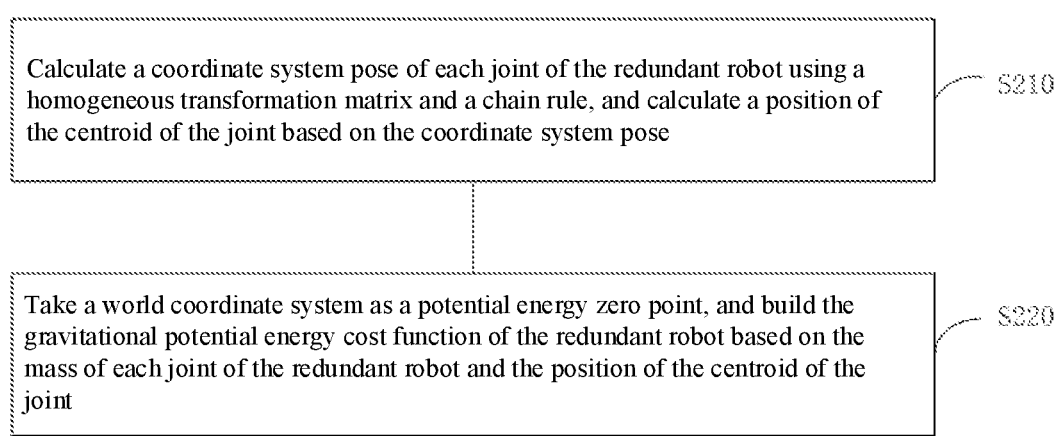
FIG. 5 is a flow chart of the third embodiment of an inverse kinematics solving method for redundant robot according to the present disclosure.

In one embodiment, since each joint is subjected to gravity during the movement in a space, a gravitational potential energy will be generated. In this case, the energy cost function is a gravitational potential energy cost function. FIG. 5 is a flow chart of the third embodiment of an inverse kinematics solving method for redundant robot according to the present disclosure. As shown in FIG. 5, the build of the gravitational potential energy cost function mainly includes the following sub-steps.

S210: calculating a coordinate system pose of each joint of the redundant robot using a homogeneous transformation matrix and a chain rule, and calculating a position of the centroid of the joint based on the coordinate system pose.

In which, the relationship of shifting and rotation between two coordinate systems can be expressed by the homogeneous transformation matrix, and the relation between a plurality of coordinate systems can be determined through the chain rule of the homogeneous transformation matrix. Based on each joint angle, the position and posture of each joint coordinate system (i.e., the coordinate system pose) can be solved through the homogeneous transformation matrix, which belongs to the forward kinematics of the robot. It can be understood that, the expression of the coordinate system pose of each joint that is calculated in the above-mentioned sub-step S210 is related to each joint angle, and the built energy cost function is also a function of the variable of each joint angle.

Then, based on the coordinate system pose of each joint and the vector of the centroid of the joint in its own joint coordinate system, the position of the centroid of each joint in the world coordinate system, that is, the above-mentioned position of the centroid of the joint, is calculated. For example, if the number of the joints of the redundant robot is n, for the i-th joint (i=1, . . . , n), through forward kinematics, it can obtain: $[\vec{o}_i, \vec{k}_i, \vec{r}_i]=FK(\Theta)$, where $\vec{o}_i$, $\vec{k}_i$, and $\vec{r}_i$ respectively represent the position of the i-th joint coordinate system, the rotational axis vector of the i-th joint and the position of the centroid of the i-th joint, and $FK(\Theta)$ represents the forward kinematics function of the variable of each joint angle. For the calculation process of forward kinematics, please refer to the existing related literature, which will not be described in detail herein.

S220: taking a world coordinate system as a potential energy zero point, and building the gravitational potential energy cost function of the redundant robot based on the mass of each joint of the redundant robot and the position of the centroid of the joint.

The gravitational potential energy of the robot is equal to the total mass of the robot multiplied by the acceleration of gravity and then by the position of the centroid of the robot. Therefore, the position of the centroid of the robot can be calculated through the weighted average of the centroid of all the joints. For example, the weight of the centroid of each joint can be equal to the mass of the joint divided by the total mass of the robot.

For example, if the position of the centroid of the i-th joint is $\vec{r}_i$, the weight is $$\frac{m_i}{\sum m_i},$$

where $m_i$ is the mass of the i-th joint, and the position $\vec{r}_{com}$ of the centroid of the redundant robot meets $$\vec{r}_{com} = \frac{\sum m_i \vec{r}_i}{\sum m_i}.$$

Therefore, the expression of the gravitational potential energy cost function G is $G=Mg \cdot \vec{r}_{com}$, where M represents the total mass of the redundant robot, which is obtained by adding the masses of all the joints; g is the acceleration of gravity.

Then, the differential extremum solving is performed on the gravitational potential energy cost function to obtain $$\frac{\partial G}{\partial \theta_i} = 0.$$

Therefore, the result obtained from the extremum is substituted into the above-mentioned expression of the Jacobian matrix null space, and a set of the joint angles of the redundant robot in the smallest gravitational potential energy can be obtained.

In other embodiments, the energy cost function can be built as a gravity compensation function, and the configuration corresponding to the smallest gravity compensation is selected as the result of inverse kinematics solving.

Since the robotic arm is subjected to gravity, a gravity moment will be generated at the joint, and the gravity moment will vary with the joint angle. In motion control, the gravity moment is usually taken as a nonlinear disturbance, and the gravity moment of the robot is directly compensated at each joint through feedforward control, so that the gravitational term does not need to be considered in the derivation of the control algorithm, which facilitates decoupling the error so as to simplify the design of the control of the robot.

If the energy cost function is a gravity compensation function, in the above-mentioned step S20 which builds the energy cost function of the redundant robot based on the forward kinematics algorithm, as an example, the coordinate system pose of each joint can be calculated using the homogeneous transformation matrix and the chain rule, where the coordinate system pose of the joint is an expression of each joint angle. Then, the coordinate system pose is used to calculate the position of the centroid and the rotational axis vector of the corresponding joint. For details, please refer to the above-mentioned sub-step S210, which will not be described herein.

For example, if the number of the joints of the redundant robot is n, for the servo of the i-th joint, the gravity compensation moment required for the i-th joint of the redundant robot is calculated based on the sum of the rotational axis vector of the i-th joint and a gravity moment generated by the i+1-th joint to the n-th joint, that is, the expression of the gravity compensation moment $\tau_i$ required by the i-th joint is:

$$\tau_i = \vec{k}_i \cdot \sum_{j=1}^{n} [(\vec{r}_{com,j} - \vec{r}_{o,i}) \times m_j \vec{g}];$$

where, $\vec{k}_i$ is the rotational axis vector of the i-th joint, $m_j \vec{g}$ is the gravity on the j-th joint, mi is the mass of the j-th joint, $\vec{g}$ is the acceleration vector of gravity, $\vec{r}_{com,j}$ is the position of the centroid of the j-th joint, that is, the position of the centroid of the j-th joint in the world coordinate system, and $\vec{r}_{o,i}$ is the coordinate system position of the i-th joint, that is, the position of the i-th joint coordinate system in the world coordinate system. All the positions can be calculated through forward kinematics. It can be understood that, the gravity moment generated by a certain joint is calculated according to the gravity on the joint and the distance between the position of the centroid of the joint and the coordinate system position.

In which, for each joint, the moment to be compensated is equal to the projection of the gravity moment generated by all the joints after the above-mentioned joint in the direction of the rotation axis of the above-mentioned joint. For example, if the number of the joints of the redundant robot is 3, for the second joint, the required gravity compensation moment should be the projection of the gravity moment generated by the first joint in the direction of the rotation axis of the second joint. For another example, for the third joint, the required gravity compensation moment should be the projection of the sum of the gravity moments generated by the first joint and the second joint in the direction of the rotation axis of the third joint. It can be understood that, if the redundant robot includes more joints, the gravity compensation moment required for each joint can be calculated in the same manner.

In this embodiment, the gravity compensation required by the redundant robot is the sum of the gravity compensation moments of all the joints. As an example, the gravity compensation function for the redundant robot is:

$$\tau_i = \overline{k}_i \cdot \sum_{j=1}^{n} [(\overline{r}_{com,j} - \overline{r}_{o,i}) \times m_j \overline{g}].$$

Similar to the above-mentioned gravitational potential energy cost function, since the gravity compensation function also merely has one variable of the joint angle $\theta_i$, the gravitational potential energy cost function is then differentiated and extremum solved to obtain $$\frac{\partial \tau}{\partial \theta_i} = 0.$$

Therefore, the result obtained from the extremum is substituted into the above-mentioned expression of the Jacobian matrix null space, and a set of joint angles of the redundant robot in the minimum gravity compensation can be obtained. The set of joint angles are taken as the inverse kinematics solution of the redundant robot with the same end pose to transmit to the corresponding servo of the joint to so as to control the redundant robot to move.

In other embodiments, the energy cost function can also be a virtual repulsive potential energy or the like. As an example, an artificial repulsive potential field can be added to each joint so as to calculate the expression of the repulsive potential energy on the redundant robot which is generated by the surrounding obstacles when the redundant robot is at the current position, and the potential field can be added according to actual needs. As an example, in the case that there are obstacles in the robot workspace and going to keep all the links of the redundant robot that are connect to the joints away from obstacle as far as possible while the desired position and orientation of the end effector is given, the energy cost function can be built by adding an artificial repulsive potential field centered on the obstacle. In which the artificial repulsive potential field can be created based on the coulomb's law as follows:

$$E_i = \frac{m_{obstacle} \cdot m_{linki}}{r_i^2}$$

$$E_{total} = \sum E_i;$$

where, $E_i$ is the repulsive potential energy between the obstacle and link i, and $r_i$ is the distance between the obstacle and link i. In which, the optimal configuration has the lowest total repulsive energy Etotal.

Embodiment 3

FIG. 6 is a schematic block diagram of an embodiment of an inverse kinematics solving apparatus according to the present disclosure. As shown in FIG. 6, in this embodiment, an inverse kinematics solving apparatus 10 for a redundant robot (e.g., the redundant robot 1 of FIG. 1) is provided based on the inverse kinematics solving method of the above-mentioned embodiment 1. The inverse kinematics solving apparatus 10 includes:

a null space solving module 100 configured to obtain an expression of a Jacobian matrix null space of a current configuration of each robotic arm of the redundant robot corresponding to a preset end pose of the robotic arm according to the preset end pose, and obtain a relation between an angular velocity of the joints of the redundant robot in the Jacobian matrix null space of the current configuration based on the obtained expression;

an energy cost function building module 200 configured to traverse the Jacobian matrix null space using the relation, and build an energy cost function of the redundant robot based on the relation, where the energy cost function is a judging criterion to determine an optimal inverse kinematics solution in the Jacobian matrix null space; and an inverse kinematics solution obtaining module 300 configured to obtain a target joint angle of each joint of the redundant robot based on the optimal inverse kinematics solution to transmit to the servo of the joint so as to control the joint.

It can be understood that, in this embodiment, the apparatus 10 corresponds to the method of the foregoing embodiment 1 or 2, and the optional parameters of the foregoing embodiment 1 or 2 are also applicable to this embodiment, which will not be described in detail herein.

In this embodiment, each of the above-mentioned modules/units is implemented in the form of software, which can be computer program(s) stored in a memory of the inverse kinematics solving apparatus and executable on a processor of the inverse kinematics solving apparatus. In other embodiments, each of the above-mentioned modules/units may be implemented in the form of hardware (e.g., a circuit of the inverse kinematics solving apparatus which is coupled to the processor of the inverse kinematics solving apparatus) or a combination of hardware and software (e.g., a circuit with a single chip microcomputer).

In another embodiment of the present disclosure, a redundant robot such as the redundant robot of FIG. 1 is provided, which adopts the above-mentioned inverse kinematics solving method for redundant robot to perform inverse kinematics analysis and solution so as to control the joints to move. As an example, the redundant robot includes a processor, a memory, and a computer program stored in the memory and executable on the processor, for example, an inverse kinematics solving program for redundant robot. When executing (instructions in) the computer program, the processor implements the steps in the above-mentioned embodiments of the inverse kinematics solving method for redundant robot, for example, steps S10-S30 shown in FIG. 3. Alternatively, when the processor executes the (instructions in) computer program, the functions of each module/unit in the above-mentioned device embodiments, for example, the functions of the modules 100-300 shown in FIG. 6 are implemented.

In still another embodiment of the present disclosure, a non-transitory computer readable storage medium is provided, which stores a computer program, and the above-mentioned inverse kinematics solving method for redundant robot is realized when instructions in the computer program is executed on a processor.

In the embodiments provided in the present disclosure, it should be understood that, the disclosed apparatus (device) and method may also be implemented in other manners. The device embodiments described above are only schematic. For example, the flowcharts and schematic diagrams in the drawings show the possible implementation of the system architecture, the functions, and the operations of the apparatus, methods, and computer program products according to the embodiments of the present disclosure. In this regards, each block in the flowchart or block diagram may represent a module, program segment, or part of the code, and the module, program segment, or the part of the code includes one or more executable instructions for realizing the specified logical function. It should also be noted that, in alternative implementations, the functions marked in the blocks may also be executed in a different order from the order marked in the drawings. For example, two consecutive blocks can actually be executed in parallel, or they can be executed in the reverse order, which depend on the functions involved. It should also be noted that, each block in the schematic diagram and/or flowchart, and the combination of the blocks in the schematic diagram and/or flowchart, can be realized using a dedicated hardware-based system that performs specified functions or actions, or can be realized by a combination of dedicated hardware and computer instructions.

In addition, the functional modules or units in each of the embodiments of the present disclosure can be integrated to form an independent part, or each module can exist alone, or two or more modules can be integrated to form an independent part.

If the function is implemented in the form of a software function module and sold or used as an independent product, it can be stored in a non-transitory computer readable storage medium. Based on this understanding, the essence of the technical solution of the present disclosure, its part that contributes to the prior art, or a part of the technical solution can be embodied in the form of a software product, where the computer software product is stored in a storage medium which includes a plurality of instructions for making a computer device (e.g., a smart phone, a personal computer, a server, or a network device) to execute all or part of the steps of the method described in each embodiment of the present disclosure. The above-mentioned storage media include a USB disk, a mobile hard disk, a read-only memory (ROM), a random access memory (RAM), a magnetic disk, or other media storing program codes such as an optical disk.

The forgoing is only the specific embodiment of the present disclosure, while the scope of the present disclosure is not limited thereto. For those skilled in the art, various equivalent modifications or replacements that can be easily conceived within the technical scope of the present disclosure should be included within the scope of the present disclosure.

What is claimed is:

1. A computer-implemented inverse kinematics solving method for a redundant robot having a plurality of joints each having a servo and one or more robotic arms each connecting to at least one of the joints, comprising steps of:
    obtaining an expression of a Jacobian matrix null space of a current configuration of each robotic arm of the redundant robot corresponding to a preset end pose of the robotic arm according to the preset end pose, and obtaining a relation between an angular velocity of the joints of the redundant robot in the Jacobian matrix null space of the current configuration based on the obtained expression;
    traversing the Jacobian matrix null space using the relation, and building an energy cost function of the redundant robot based on the relation, wherein the energy cost function is a judging criterion to determine an optimal inverse kinematics solution in the Jacobian matrix null space;
    obtaining a target joint angle of each joint of the redundant robot based on the optimal inverse kinematics solution to transmit to the servo of the joint and controlling the joint based on the transmitted target joint angle;
    wherein the energy cost function comprises a gravitational potential energy cost function, a gravity compensation function, or a repulsive potential energy cost function; and
    wherein the energy cost function is the gravitational potential energy cost function, and the step of building the energy cost function of the redundant robot based on the forward kinematics algorithm comprises:
        calculating a coordinate system pose of each joint of the redundant robot using a homogeneous transformation matrix and a chain rule, and calculating a position of the centroid of the joint based on the coordinate system pose; and
        taking a world coordinate system as a potential energy zero point, and building the gravitational potential energy cost function of the redundant robot based on the mass of each joint of the redundant robot and the position of the centroid of the joint.

2. The method of claim 1, further comprising steps of:
    calculating the expression of the Jacobian matrix null space of a next configuration of each robotic arm of the redundant robot after controlling the joint so as to obtain the relation between the angular velocity of each joint of the redundant robot in the Jacobian matrix null space of the next configuration, in response to the inverse kinematics solution not meeting the preset condition; and
    solving the energy optimal solution of the energy cost function according to the relation between the angular velocity of each joint of the redundant robot corresponding to the next configuration to obtain the next inverse kinematics solution corresponding to the end pose to transmit to the servo of the joint so as to control the joint, and returning to the step of calculating the expression of the Jacobian matrix null space of the next configuration of each robotic arm of the redundant robot.

3. The method of claim 1, wherein if the degree of freedom of the redundant robot is n and the current configuration is $\Theta_0$, the set of configurations of the redundant robot corresponding to a same end pose is $\Theta = \Theta_0 + \int[(I_n - J^\dagger J) \cdot p]$, and the expression of the Jacobian matrix null space meets:

$$\exists \dot{\Theta}, J \cdot \dot{\Theta} = 0, \dot{\Theta} = (I_n - J^\dagger J) \cdot p;$$

wherein, $I_n$ is an n×n identity matrix; p is any n×1 vector; J is the Jacobian matrix of the redundant robot in the current configuration; $J^\dagger$ is a pseudoinverse matrix of the Jacobian matrix, and $\dot{\Theta}$ is the angular velocity of each joint.

4. The method of claim 1, wherein the step of solving the energy optimal solution of the energy cost function according to the relation between the angular velocities of the joints in the Jacobian matrix null space comprises:
    describing a variable of each joint angle in the energy cost function based on the same variable of the joint angle according to the relation between the angular velocity of each joint of the redundant robot; and
    traversing the Jacobian matrix null space to determine the optimal inverse kinematics solution based on the energy cost function.

5. The method of claim 1, wherein the energy cost function is the gravity compensation function, and the step of building the energy cost function of the redundant robot based on the forward kinematics algorithm comprises:
  calculating the coordinate system pose of each joint of the redundant robot using the homogeneous transformation matrix and the chain rule, and calculating the position of the centroid and a rotational axis vector of the corresponding joint according to the coordinate system pose, wherein the coordinate system pose comprises a coordinate system position;
  calculating the gravity compensation moment required for the i-th joint of the redundant robot based on the sum of the rotational axis vector of the i-th joint and a gravity moment generated by the i+1-th joint to the n-th joint, in response to the number of the joints of the redundant robot is n, wherein the gravity compensation moment required by the i-th joint; wherein the gravity moment of each joint is calculated based on the mass, the coordinate system position, and the position of the centroid of the joint; and
  building the gravity compensation function of the redundant robot based on the gravity compensation moments of all the joints.

6. A redundant robot, comprising:
  a plurality of joints each having a servo;
  one or more robotic arms each connecting to at least one of the joints;
  a memory;
  a processor; and
  one or more computer programs stored in the memory and executable on the processor, wherein the one or more computer programs comprise:
  instructions for obtaining an expression of a Jacobian matrix null space of a current configuration of each robotic arm of the redundant robot corresponding to a preset end pose of the robotic arm according to the preset end pose, and obtaining a relation between an angular velocity of the joints of the redundant robot in the Jacobian matrix null space of the current configuration based on the obtained expression;
  instructions for traversing the Jacobian matrix null space using the relation, and building an energy cost function of the redundant robot based on the relation, wherein the energy cost function is a judging criterion to determine an optimal inverse kinematics solution in the Jacobian matrix null space;
  instructions for obtaining a target joint angle of each joint of the redundant robot based on the optimal inverse kinematics solution to transmit to the servo of the joint and controlling the joint based on the transmitted target joint angle;
  wherein the energy cost function comprises a gravitational potential energy cost function, a gravity compensation function, or a repulsive potential energy cost function; and
  wherein the energy cost function is the gravity compensation function, and the instructions for building the energy cost function of the redundant robot based on the forward kinematics algorithm comprise:
    instructions for calculating the coordinate system pose of each joint of the redundant robot using the homogeneous transformation matrix and the chain rule, and calculating the position of the centroid and a rotational axis vector of the corresponding joint according to the coordinate system pose, wherein the coordinate system pose comprises a coordinate system position;
    instructions for calculating the gravity compensation moment required for the i-th joint of the redundant robot based on the sum of the rotational axis vector of the i-th joint and a gravity moment generated by the i+1-th joint to the n-th joint, in response to the number of the joints of the redundant robot is n, wherein the gravity compensation moment required by the i-th joint wherein the gravity moment of each joint is calculated based on the mass, the coordinate system position, and the position of the centroid of the joint; and
    instructions for building the gravity compensation function of the redundant robot based on the gravity compensation moments of all the joints.

7. The robot of claim 6, wherein the one or more computer programs further comprises:
  instructions for calculating the expression of the Jacobian matrix null space of a next configuration of each robotic arm of the redundant robot after controlling the joint so as to obtain the relation between the angular velocity of each joint of the redundant robot in the Jacobian matrix null space of the next configuration, in response to the inverse kinematics solution not meeting the preset condition; and
  instructions for solving the energy optimal solution of the energy cost function according to the relation between the angular velocity of each joint of the redundant robot corresponding to the next configuration to obtain the next inverse kinematics solution corresponding to the end pose to transmit to the servo of the joint so as to control the joint, and returning to calculate the expression of the Jacobian matrix null space of the next configuration of each robotic arm of the redundant robot.

8. The robot of claim 6, wherein if the degree of freedom of the redundant robot is n and the current configuration is $\Theta_0$, the set of configurations of the redundant robot corresponding to a same end pose is $\Theta = \Theta_0 + \int [(I_n - J^\dagger J) \cdot p]$, and the expression of the Jacobian matrix null space meets:

$$\exists \dot{\Theta}, J \cdot \dot{\Theta} = 0, \dot{\Theta} = (I_n - J^\dagger J) \cdot p;$$

wherein, $I_n$ is an n×n identity matrix; p is any n×1 vector; J is the J t Jacobian matrix of the redundant robot in the current configuration; $J^\dagger$ is a pseudoinverse matrix of the Jacobian matrix, and $\dot{\Theta}$ is the angular velocity of each joint.

9. The robot of claim 6, wherein the instructions for solving the energy optimal solution of the energy cost function according to the relation between the angular velocities of the joints in the Jacobian matrix null space comprise:
  instructions for describing a variable of each joint angle in the energy cost function based on the same variable of the joint angle according to the relation between the angular velocity of each joint of the redundant robot; and
  instructions for traversing the Jacobian matrix null space to determine the optimal inverse kinematics solution based on the energy cost function.

10. The robot of claim 6, wherein the energy cost function is the gravitational potential energy cost function, and the instructions for building the energy cost function of the redundant robot based on the forward kinematics algorithm comprise:

instructions for calculating a coordinate system pose of each joint of the redundant robot using a homogeneous transformation matrix and a chain rule, and calculating a position of the centroid of the joint based on the coordinate system pose; and instructions for taking a world coordinate system as a potential energy zero point, and building the gravitational potential energy cost function of the redundant robot based on the mass of each joint of the redundant robot and the position of the centroid of the joint.

11. A non-transitory computer readable storage medium storing instructions executable on a processor to implement an inverse kinematics solving method for a redundant robot having a plurality of joints each having a servo and one or more robotic arms each connecting to at least one of the joints, and the instructions comprise:

instructions for obtaining an expression of a Jacobian matrix null space of a current configuration of each robotic arm of the redundant robot corresponding to a preset end pose of the robotic arm according to the preset end pose, and obtaining a relation between an angular velocity of the joints of the redundant robot in the Jacobian matrix null space of the current configuration based on the obtained expression;

instructions for traversing the Jacobian matrix null space using the relation, and building an energy cost function of the redundant robot based on the relation, wherein the energy cost function is a judging criterion to determine an optimal inverse kinematics solution in the Jacobian matrix null space;

instructions for obtaining a target joint angle of each joint of the redundant robot based on the optimal inverse kinematics solution to transmit to the servo of the joint and controlling the joint based on the transmitted target joint angle;

wherein the energy cost function comprises a gravitational potential energy cost function, a gravity compensation function, or a repulsive potential energy cost function; and wherein the energy cost function is the gravitational potential energy cost function, and the instructions for building the energy cost function of the redundant robot based on the forward kinematics algorithm comprise:

instructions for calculating a coordinate system pose of each joint of the redundant robot using a homogeneous transformation matrix and a chain rule, and calculating a position of the centroid of the joint based on the coordinate system pose; and instructions for taking a world coordinate system as a potential energy zero point, and building the gravitational potential energy cost function of the redundant robot based on the mass of each joint of the redundant robot and the position of the centroid of the joint.

12. The storage medium of claim 11, wherein the instructions further comprise:

instructions for calculating the expression of the Jacobian matrix null space of a next configuration of each robotic arm of the redundant robot after controlling the joint so as to obtain the relation between the angular velocity of each joint of the redundant robot in the Jacobian matrix null space of the next configuration, in response to the inverse kinematics solution not meeting the preset condition; and instructions for solving the energy optimal solution of the energy cost function according to the relation between the angular velocity of each joint of the redundant robot corresponding to the next configuration to obtain the next inverse kinematics solution corresponding to the end pose to transmit to the servo of the joint so as to control the joint, and returning to calculate the expression of the Jacobian matrix null space of the next configuration of each robotic arm of the redundant robot.

13. The storage medium of claim 11, wherein if the degree of freedom of the redundant robot is n and the current configuration is $\Theta_0$, the set of configurations of the redundant robot corresponding to a same end pose is $\Theta=\Theta_0+\int[(I_n-J^{\dagger}J)\cdot p]$, and the expression of the Jacobian matrix null space meets:

$$\exists \dot{\Theta}, J \cdot \dot{\Theta}=0, \overline{\Theta}=(I_n-J^{\dagger}J)\cdot P;$$

wherein, $I_n$ is an n×n identity matrix; p is any n×1 vector; J is the Jacobian matrix of the redundant robot in the current configuration; $J^{\dagger}$ is a pseudoinverse matrix of the Jacobian matrix, and $\dot{\Theta}$ is the angular velocity of each joint.

14. The storage medium of claim 11, wherein the instructions for solving the energy optimal solution of the energy cost function according to the relation between the angular velocities of the joints in the Jacobian matrix null space comprise:

instructions for describing a variable of each joint angle in the energy cost function based on the same variable of the joint angle according to the relation between the angular velocity of each joint of the redundant robot; and instructions for traversing the Jacobian matrix null space to determine the optimal inverse kinematics solution based on the energy cost function.

15. The storage medium of claim 11, wherein the energy cost function is the gravity compensation function, and the instructions for building the energy cost function of the redundant robot based on the forward kinematics algorithm comprise:

instructions for calculating the coordinate system pose of each joint of the redundant robot using the homogeneous transformation matrix and the chain rule, and calculating the position of the centroid and a rotational axis vector of the corresponding joint according to the coordinate system pose, wherein the coordinate system pose comprises a coordinate system position;

instructions for calculating the gravity compensation moment required for the i-th joint of the redundant robot based on the sum of the rotational axis vector of the i-th joint and a gravity moment generated by the i+1-th joint to the n-th joint, in response to the number of the joints of the redundant robot is n, wherein the gravity compensation moment required by the i-th joint; wherein the gravity moment of each joint is calculated based on the mass, the coordinate system position, and the position of the centroid of the joint; and instructions for building the gravity compensation function of the redundant robot based on the gravity compensation moments of all the joints.

* * * * *